Dec. 16, 1958     C. D. BURDICK ET AL     2,864,570
SERVO SYSTEM FOR CONTROLLING DIRIGIBLE CRAFT
WITH PRIMARY AND TRIM TAB SURFACES
Filed Aug. 30, 1955
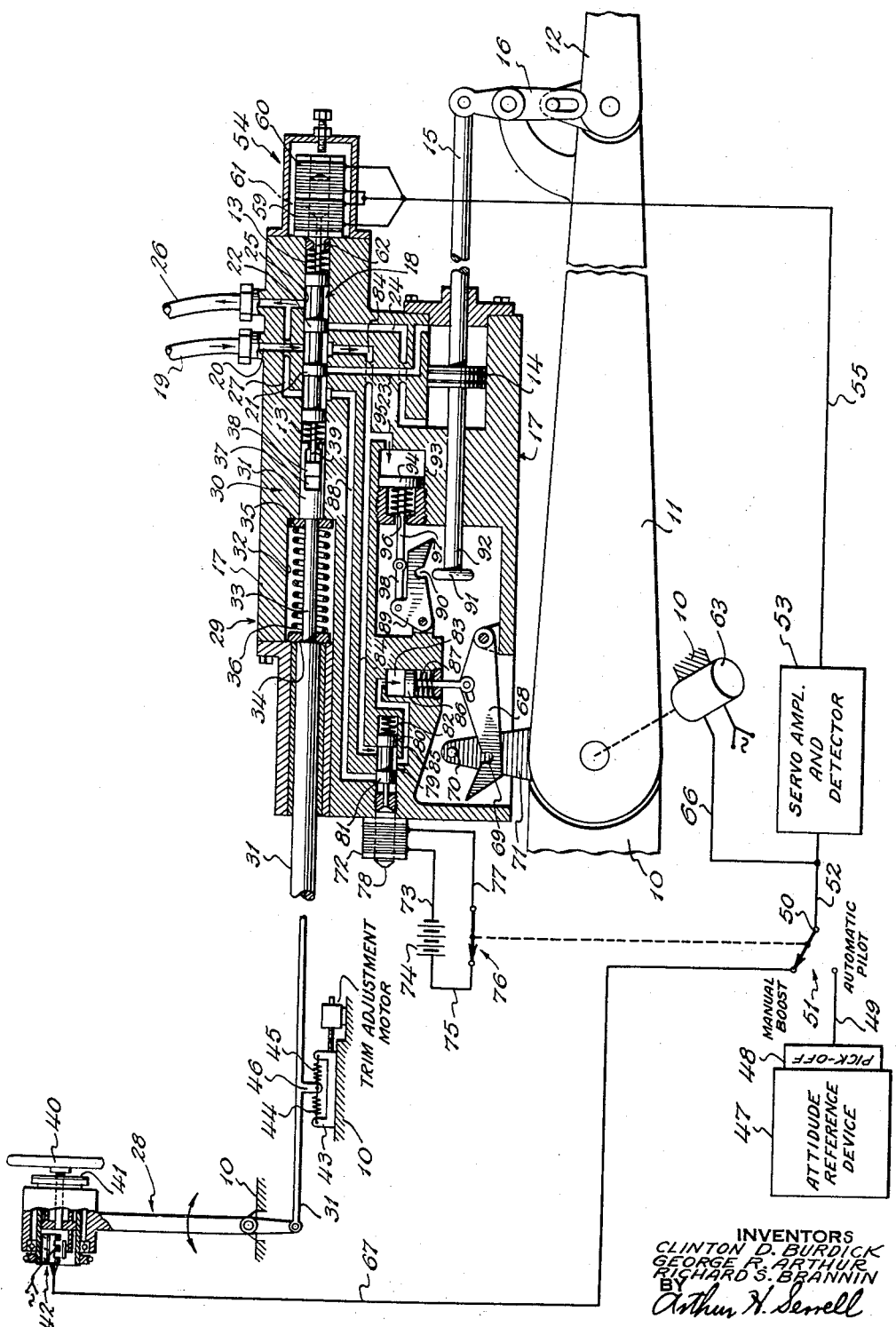
INVENTORS
CLINTON D. BURDICK
GEORGE R. ARTHUR
RICHARD S. BRANNIN
BY
Arthur H. Serrell
ATTORNEY

United States Patent Office 2,864,570
Patented Dec. 16, 1958

2,864,570

SERVO SYSTEM FOR CONTROLLING DIRIGIBLE CRAFT WITH PRIMARY AND TRIM TAB SURFACES

Clinton D. Burdick, Great Neck, George R. Arthur, Syosset, and Richard S. Brannin, East Williston, N. Y., assignors to Sperry Rand Corporation, a corporation of Delaware Application August 30, 1955, Serial No. 531,317

12 Claims. (Cl. 244—78)

This invention relates to a manual boost and automatic pilot servo system for dirigible craft of the character whose motions about an axis are caused aerodynamically through direct actuation of a trim tab control surface and indirect control thereby of the opposite movements of the main control or steering surface of the craft.

One of the objects of the present invention is to provide a servo system of the character described utilizing direct manual and direct automatic pilot controls to the trim tab surface of the dirigible craft in which the effective automatic pilot control can be overridden by the manual control.

A further object of the invention is the provision of a system to this character in which direct manual control of the trim tab surface of the craft is always effective regardless of the operating condition of the system's power motor or the condition of the electrical components included therein to provide either automatic pilot or manual boost controls.

One of the features of the invention resides in an interlocking means between the power motor housing element of the system and the indirectly actuated control surface of the craft. In the manual boost mode of conditioning of the system, means are provided for disabling the interlocking means between the housing element and the main control surface.

A further feature of the invention is provided by a means for interlocking the directly actuated and indirectly controlled surfaces of the craft through the power motor. Such means is effective automatically being dependent upon the supply of power to the power motor and is required to assure direct manual control of the trim tab surface in emergency conditions where the supply of power has failed. The system includes means dependent upon the supply of power to the power motor for rendering the noted interlocking means ineffective.

Other objects, features and structural details of the invention will be apparent from the following description when read in relation to the accompanying drawing depicting the present inventive concepts in a single diagrammatic view showing the mechanical and electrical elements of the improved system and the circuitry for the related electrical components. In the drawing, the power motor housing component of the system is shown in vertical section.

As illustrated in the drawing, the relatively fixed locations of the frame of the dirigible craft carrying the components of the improved system are indicated at 10. The element corresponding to the main control surface or steering member for the craft is designated at 11. Member 11 may be the elevator control surfaces for an aircraft that are movable to change the attitude of the craft about its pitch axis. As shown, the main control surface 11 is pivotally connected to the fixed frame 10 of the craft. In the improved system, movement of the surface 11 is accomplished through the aerodynamic effect therein of suitable means such as the auxiliary or cooperative trim tab control surfaces indicated at 12. The tab surfaces 12 are pivotally connected in conventional fashion at the trailing edge of the main control surfaces 11. In the improved control system, the power motor thereof is operatively connected to the tab surfaces 12. By movement of the tab control members 12 from a streamline or null position about its axis in relation to the main surface 11 effected through operation of the system, the main control surface is caused to move aerodynamically in the opposite direction to cause the craft to adjust its attitude about the pitch axis thereof. The adjustment effected is in accordance with the control exercised by the system through a power motor of a relatively low power rating.

As shown, the power motor included in the improved system is a reversible hydraulic motor whose movable element or piston 14 is operatively connected to the tab surface 12 by way of an extending piston rod 15 pivotally connected to a rocker arm 16 mounted on the surface 11 to move the tab surface 12. The piston reciprocates in a cylinder formed in a power motor housing element 17. The means for operating the power motor is provided by a conventional spool type balanced valve indicated at 18 that is translatably mounted in a cylindrical cavity provided in the housing element 17 of the system. Valve 18 is supplied with fluid at a constant high pressure from a suitable fluid pump source (not shown) by way of intake pipe 19 and conduit 20. In a neutral or central condition, the lands 21, 22 of the valve 18 cover the ports communicating with the passageways 23, 24 leading to the respective ends of the cylinder of the power motor. Movement of the valve 18 to the left as viewed in the drawing connects the high pressure fluid pipe 19 by way of passageway 23 to the portion of the power motor cylinder to the right of the piston 14. At the same time, the fluid in the cylinder to the left of the piston 14 is connected by way of passageway 24 to conduit 25 and low pressure or exhaust pipe 26 leading to a suitable fluid sump (not shown) or to the return or low pressure side of the fluid pump. Piston 14 is consequently urged to the left, the tab surface 12 is moved in a clockwise direction about its axis and the main control surface is moved in accordance therewith in a counterclockwise direction about its axis. With initial motion of the balanced valve 18 in a reverse direction, the pipe 19 with high pressure fluid is connected to the portion of the cylinder to the left of the piston 14 by way of passageway 24. The exhaust connection for the fluid in the cylinder to the right of the piston 14 is by way of passageway 23, conduit 27 to conduit 25, to the exhaust pipe 26. This results in motion of the tab 12 in a counterclockwise direction about its axis and proportional movement of the main control surface in a clockwise direction about its axis. The springs 13 function to maintain the valve 18 in the normally centered position in which the same is illustrated in the drawing.

The manually operable member of the system is represented in the drawing as a control column or stick 28. This element is moved by the human pilot about its pivot axis on the frame of the craft to manually effect movement of the craft about its pitch axis through the primary operation of the trim tab surfaces. As shown, the control stick 28 is operatively connected to the housing element 17 of the power motor for the tab through a yielding connection generally indicated at 29. The power motor operating means or balanced valve 18 is also operatively connected to the manual operable member 28 through a slide connection generally indicated at 30 which permits the human pilot to override the automatic pilot controls when required. The structure of the considered connections is provided by a slide link 31 mounted to move translationally relative to the housing element 17 in a suitable fixed bushing formed as a part of the housing. As shown, the left hand end of the link 31 is pivotally connected to the control column 28. The yielding connection structure provided includes a cylindrical opening 32 in the power motor housing 17 through which the link 31 extends axially. A portion of the link 31 of reduced diameter 33 of the same lengthwise dimension as the lengthwise dimension of the cylindrical opening 32 carries two spaced slide washers 34 and 35 thereon that are separated by a compressed spring 36. The washers 34 and 35 are urged to the limiting positions on the reduced diameter portion of the link 31 where the same also engage the end walls of the cylindrical opening 32 in the housing 17. This establishes a normal centralized relation between the housing element 17 and slide link 31 in the absence of a force applied to the control stick or column 28. With application of force on the stick by the human pilot to move the stick clockwise as viewed in the drawing, the slide link 31 is urged to the left with washer 35 further compressing the spring 36 whose opposite end is held by the washer contacting the housing element 17. The described arrangement provides a yielding connection between the power motor housing element 17 and the manually operable member of the system. With a force by the human pilot in a reverse direction on the stick 28, link 31 moves to the right carrying washer 34 which urges washer 35 through the spring 36 against the housing element 17.

The right hand end of the slide link 31 is operatively connected to the balanced valve 18 or operating means for the power motor of the system through the override slide connection 30. As shown, this connection is provided by a piston and cylinder arrangement permitting a designed degree of relative movement between the parts before engagement. The cylinder of this arrangement as indicated at 37 is formed in the right hand end of the slide link 31. The piston 38 operating in the cylinder 37 is connected to the left hand end of the balanced valve 18 by a fixed rod 39. In order for the control column 28 to provide movement of the valve 18 through the connection 30 it is necessary to move the link 31 sufficiently to engage one of the end walls of the cylinder 37 with the piston 38. This is accomplished when the human pilot by manual effort desires to override the automatic pilot of the system.

The manually operable member or control column 28 shown herein may be constructed in the form depicted in detail in Figs. 1 and 2 of U. S. Letters Patent 2,408,770, issued October 8, 1946 to C. A. Frische, et al., for an Electro-Hydraulic Control System. The member herein illustrated in this connection includes a wheel grip portion 40, an elastic diaphragm 41 and a conventional transformer type alternating current electrical signal pick-off 42 whose three-legged wound stator is fixed in position on the column and whose armature is connected to the elastic diaphragm 41. The pick-off 42 is operatively connected to the manually operable member consisting of the wheel 40 on the manual control stick 28 and provides an operating signal in the manual boost mode of conditioning of the improved system when the human pilot applies a force to the member in either a clockwise or counterclockwise direction about its axis. The amplitude and phase of the alternating curent output signal of the pick-off 42 are dependent respectively on the force exerted by the human pilot on the wheel 40 and the direction of the applied force. The stiffness of the diaphragm 41 may be made relatively high so that direct manual control of the tab surfaces 12 may be exerted by the human pilot without the human pilot being aware of excessive "give" in the handling of the control column and wheel.

Spring centering means are provided for the manually operable control member 28 to maintain the feel of the human operator's control on the tab surface 12 in the system. As shown, such artificial feel device may comprise a bracket 43 slidably mounted on the frame 10 having two opposed springs 44, 45 thereon connected to an extending arm 46 from link 31. The bracket 43 is positioned relatively to the fixed frame of the craft by a trim adjustment thereof as shown and described in U. S. Letters Patent No. 2,227,375, issued December 31, 1940 to B. G. Carlson. The trim adjustment required for the condition of operation of the craft may be made by the human pilot through a motor and worm connection to the bracket 43 as shown in the drawing.

The improved servo system also includes an automatic pilot means for controlling the craft through the trim tab surfaces 12. As diagrammatically indicated herein such means may be provided by an attitude reference device 47 with a pitch pick-off 48 producing a signal in accordance with departure of the craft from a reference position about its pitch or athwartships axis. The device 47 with its pitch pick-off 48 may take the specific form of an automatic pilot gyro vertical of the character shown in Fig. 1 of the hereinbefore mentioned Frische et al. Patent No. 2,408,770. As shown, the control signal of the pick-off 48 may be fed by way of lead 49, the blade 50 of selector switch 51, and lead 52 to a servo amplifier and detector indicated at 53 which may be of the general character shown in Fig. 2 of U. S. Letters Patent No. 2,398,421 to C. A. Frische et al. The D. C. output of the amplifier and detector unit 53 is fed to the servomotor 54 of the automatic pilot means by way of lead 55. The servomotor 54 shown in the drawing is a device for translating the valve 18 consisting of a compound solenoid having axially spaced stator windings 59 and 60 that are fixedly mounted on the housing element 17. Windings 59 and 60 have a common connection to the detector 53 and are wound in opposing relation. The windings are selectively energized by the output of the amplifier and detector 53 as determined by the controlling input thereto from pick-off 48. As shown, the servomotor 54 includes a single armature 61 that is connected to valve 18 by rod 62. In the centralized position of the valve 18, the armature 61 as illustrated is located with equal areas thereof within the respective coils or windings 59 and 60 of the solenoid. With energization of winding 60 the armature 61 moves to the right carrying the valve 18 with it as permitted by the slide connection 30. With winding 59 energized, the opposite motion in translation occurs. In both instances, the power motor is operated by the operating means or valve 18 controlling the same to move the tab 12 in the correct sense to obtain the required action of the main surface 11 of the craft. The automatic pilot means of the system also includes a means for providing a repeatback signal for controlling the servomotor in accordance with the departure of the main control surface 11 from a null condition. As shown, this signal is obtained by use of a selsyn type pick-off 63 whose stator is fixed to the frame 10 of the craft and whose rotor is positioned by the primary control surface 11. Lead 66 connects the rotor of the pick-off 63 to the input lead 52 of the amplifier and detector 53. The stator of the pick-off is energized from a suitable source of alternating current electrical energy. Lead 67 connects pick-off 42 to the switch 51 of the system. As shown, the two position switch device 51 is settable in either an automatic pilot position or a manual boost position so that the system may be alternatively controlled by either the pick-off 48 of the reference device 47 or the pick-off 42 on the control stick or column 28.

The improved servo system further includes means for interlocking the power motor housing element 17 and the main control surface of the craft. Such means is provided by a latch member 68 pivotally mounted within a cavity formed in the housing 17. The latch 68 has a notch 69 therein which engages a fixed detent piece 70 located on an arm 71 extending from the main surface 11. When engaged, the interfitting latch and detent parts lock the housing element 17 to the surface 11 so that these parts move as a unit about the axis of the surface 11. The described interlocking means is rendered effective when the system is set to operate in the automatic pilot mode by means of a solenoid 72 whose coil is fixed to the housing element 17. The solenoid is energized by a suitable circuit including lead 73, battery 74, lead 75, the open blade of a switch 76 and lead 77. The blade of switch 76 is represented as ganged to switch 51 so that with switch 51 set in the automatic pilot position, the switch 76 is open and the solenoid 72 unenergized. When switch 51 is set in the manual boost position, as shown, the switch 76 is closed and the solenoid 72 is energized so that the interlocking means is rendered ineffective or disabled. The interlocking means is rendered effective by the switching device 51 when set in the automatic pilot position. The solenoid 72 includes an armature 78 connected to a valve 79 with lands 80 and 81. In the operative condition shown, the armature 78 holds the valve 79 to the right against the action of spring 82 so that fluid under pressure from pipe 19 is supplied to a cylindrical chamber 83 in the housing 17 by way of conduit 20, conduit 84 and conduit 85. The piston element 86 within the chamber 83 is then held downwardly against the action of the heavy spring 87. Element 86, which is connected to the latch 68 by a suitable pin and slot connection, holds the latch 68 so that the notch 69 thereof is out of fitting engagement with the detent 70 on the arm 71 of the surface 11. The parts remain unlocked as long as the solenoid 72 is energized and there is a supply of high pressure fluid for the hydraulic power motor of the system. When the system is conditioned for automatic pilot operation, the switch blade 50 of switching device 51 is set in the automatic pilot position, the energizing circuit to solenoid 72 is opened by the switch 76, and armature 78 is moved by spring 82 so that land 80 closes the communication between the cylinder 83 and the source of high fluid pressure at intake pipe 19. The pressure above piston 86 is then relieved by way of conduit 85, conduit 88 to conduit 27 and conduit 25 to the low pressure or exhaust pipe 26. The spring 87 then actuates the piston element 86 to cause the latch 68 to engage the detent 70 and thereby condition the surface 11 and housing element 17 in interlocked relation. The described springs 87, 82 and solenoid 72 provide means rendered effective by the switching device 51 when set in manual boost position for connecting the pick-off 42 of the manual operable member 28 with the servomotor 54 of the automatic pilot and for disabling the described interlocking means between the housing 17 and surface 11.

To facilitate entirely manual mechanical operation of the system under emergency conditions where for instance the servomotor 54 is disabled and the system is not operative through the automatic pilot or through the pick-off 42 at the manual operable member 28 and where the supply of power to the power motor is out of commission with loss of the fluid pressure at the intake pipe 19, means are provided for interlocking the movable element or piston 14 of the power motor and the housing 17 so that a direct connection between the tab surface 12 and member 28 is obtained through the yielding connection 29. The interlocking means shown in the drawing includes a latch piece 89 pivotally mounted in a cavity in the housing element 17 having a notch 90 therein adapted to engage a lug part 91 situated on a rod 92 extending from the left side of the piston 14. The latch piece 89 and lug part 91 are normally rendered ineffective by means dependent upon the supply of power to the power motor provided by a cylinder and piston combination shown respectively at 93 and 94. Conduit 95 supplies fluid under pressure from conduits 84, 20 and the intake pipe 19 to the cylinder 93 to normally urge the piston 94 against the action of spring 96 to raise the latch piece 89 out of the engagement with lug part 91. The piston 94 is connected to the latch piece through rod 97 and link 98. The spring 96 provides a means dependent upon the loss of power to the power motor for rendering the interlocking means effective. Without pressure in the cylinder 93, the spring 96 urges the piston 94 to the right and moves the latch piece 89 so that the notch therein engages the lug part 91 and locks the movable element of the power motor to the power motor housing. The described means interlocks the surfaces 12 and 11 through the power motor under the noted conditions of emergency operation.

In operation of the system, in an automatic pilot mode, the switching device 51 is closed with blade 50 connecting leads 49 and 52. The switch 76 is then opened so that the solenoid 72 is deenergized and the main control surface 11 and power motor housing are interlocked by the engagement of notch 69 on latch 68 with detent 70. In this mode, the attitude reference device 47 and the followback pick-off 63 control the operation of the power motor to tab surface 12 through the servomotor 54 and the balanced valve 18. The system permits the human pilot to manually override the automatic pilot controls in this mode which is accomplished by manual movement of the member 28 through the yielding connection 29 and the override slide connection 30 so that the valve 18 is positioned as desired by the member 28 through slide rods 31 and 39 instead of as required by the servomotor 54. The means for operating the power motor in the form of valve 18 is operatively connected to the automatic pilot servomotor 54 by the rod 62 and to the manually operable means 28 through the override connection 30, the yielding connection 29 and the slide rods 31 and 39. In normal automatic pilot operation, the member 28 is urged through the yielding connection 29 and rod 31 to follow the motions of the main control surface 11 and the power motor housing 17 interlocked therewith. In this mode of operation, the locked housing part 17 of the power motor moves with the main control surface 11 about its axis and the piston part 14 thereof is operatively connected to the trim tab surface 12 by way of rod 15 and the rocker arm 16.

In the manual booster mode of operation of the system, the switching device 51 is set as shown so that the blade 50 connects lead 67 and lead 52. The switch 76 is located in a closed position, and the solenoid 72 is energized so that the interlock between the surface 11 and power motor housing 17 is rendered ineffective, the piston element 86 operating to disengage the latch 68 and the detent 70. In this mode, the system is controlled by the output of the signal pick-off 42 at the manually operable member 28 through operation of the automatic pilot servomotor 54 and the valve 18. Switches 51 and 76 provide a common means for connecting the pick-off 42 of the manually operable member with the servomotor 54 of the automatic pilot and for disabling the interlocking means between the power motor housing element and the main control surface of the craft. The described interlocking means is rendered ineffective only when the system functions in the manual boost mode with switch 51 set as shown in the drawing. In this mode of operation, the housing 17 of the power motor is free to float on the rod 31 as restricted by the yielding connection 29 and the trim adjustment springs 44, 45.

In conditions of operation where pressure at the intake pipe 19 is available and the normal control through the servomotor 54 is out of commission, the system is operative through the override connection 30 between the valve 18 and the manually operable member 28. In this type of operation, it is necessary that switch 76 be open so that the surface 11 and element 17 are interlocked, Where the pressure from the fluid supply at intake pipe 19 or the power supply to the power motor has also failed, the latch 89 engages lug 91 to interlock the movable element of the power motor with the power motor housing. With the interlock between the surfaces 11 and 12 effective, the system remains operable from the member 28 through the yielding connection 29 to the power motor housing 17 to the main control surface 11 and the interlocked surface 12. In this condition, the interlock between the housing 17 and surface 11 is also effective. In this extreme condition of emergency operation, the surfaces 11 and 12 in effect become a single surface that remains under control of the human pilot by operation of the manual member 28 through the rod 31, yielding connection 29 and the housing 17 which is interlocked with the main surface 11.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a dirigible craft having a main control surface and an auxiliary trim tab surface, a manual override and automatic pilot servo system including, a manually operable member, automatic pilot means including a servomotor, a power motor having a housing element and a movable element operatively connected to the trim tab surface, an override yielding connection between the power motor housing element and the manually operable member, means for interlocking said power motor housing element and the main control surface of the craft, and means for operating said power motor operatively connected to said automatic pilot servomotor and said manually operable means through said override connection.

2. In a dirigible craft having a main control surface and an auxiliary trim tab surface, a manual and automatic pilot servo system including a manually operable member, automatic pilot means including a servomotor, a power motor having a housing element and a movable element operatively connected to the trim tab surface, a yielding connection between the power motor housing element and the manually operable member, means for operating said power motor operatively connected to said automatic pilot servomotor and said manually operable member, a switch device settable in automatic pilot or manual position, and means rendered effective by said switching device when set in automatic pilot position for interlocking said power motor housing element and the main control surface of the system.

3. A servomotor system of the character claimed in claim 2 in which said automatic pilot means includes a pick-off providing a repeatback signal for said servomotor in accordance with the departure of the main control surface from a null condition.

4. In a dirigible craft having a main control surface and an auxiliary trim tab surface, a manual booster and automatic pilot servo system including a manually operable member, a signal pick-off operatively connected to said member, automatic pilot means including a servomotor, a power motor having a housing element and a movable element operatively connected to the trim tab surface, means for operating said power motor operatively connected to said automatic pilot servomotor, means for interlocking said power motor housing element and the main control surface of the craft, a switch device settable in automatic pilot or manual boost position, and means rendered effective by said switching device when set in manual boost position for connecting the pick-off of the manual operable member with the servomotor of the automatic pilot and for disabling said interlocking means.

5. A servo motor system of the character claimed in claim 4, in which said manual booster servo system includes a pick-off providing a repeatback signal for said servomotor in accordance with the departure of the main control surface from a null condition.

6. The combination in a servo system for dirigible craft having a main control surface and an auxiliary trim tab surface, of a power motor having a movable element operatively connected to the trim tab surface, a housing element for the movable element of the power motor, a manually operable member, a yielding connection between the member and power motor housing, an automatic pilot including a servomotor, means for operating said power motor responsive to the automatic pilot servomotor, and means effective with operation of the system in an automatic pilot mode for interlocking the power motor housing element and the main control surface.

7. The combination in a servo system for dirigible craft having a main control surface and an auxiliary trim tab surface, of a power motor having a movable element operatively connected to the trim tab surface, a housing element for the movable element of the power motor, means for interlocking said power motor housing element and the main control surface, a manually operable member, a signal pick-off operatively connected to said member, means for operating said power motor responsive to the signal of said pick-off, and means effective with operation of the system in a manual boost mode for disabling said interlocking means.

8. The combination in a manual booster and automatic pilot servo system for dirigible craft having a main control surface and an auxiliary trim tab surface, of a power motor having a movable element operatively connected to the trim tab surface, a housing element for the movable element of the power motor, means for interlocking the element of the power motor housing element and the main control surface, a manually operable member, a yielding connection between the power motor housing element and the manually operable member, and means for operating said power motor operatively connected to said manually operable member through said yielding connection.

9. In a dirigible craft having a main control surface and an auxiliary trim tab surface, a manual booster and automatic pilot servo system including a manually operable member, automatic pilot means including a servomotor, a power motor having a housing element and a movable element operatively connected to the trim tab surface, means dependent on operation of the system in the automatic pilot mode for interlocking the power motor housing element and the main control surface of the craft, a yielding connection between the power motor housing element and the manually operable member, and means for operating said power motor operatively connected to said automatic pilot servomotor and said manually operable member.

10. In a dirigible craft having a main control surface and an auxiliary trim tab surface, a power motor having a movable element operatively connected to the trim tab surface, a housing element for the movable element of said power motor, a manually operable member, a yielding connection between the power motor housing element and the manually operable member, means for operating said power motor operatively connected to said manually operable member, means for interlocking the movable element of said power motor and power motor housing, and means dependent upon the supply of power to said power motor for rendering said interlocking means ineffective.

11. In a dirigible craft having an auxiliary trim tab surface, a power motor comprising a housing and a movable element operatively connected to the trim tab surface, normally ineffective means for interlocking the movable element of said power motor and power motor housing, means dependent upon loss of power to said power motor for rendering said interlocking means effective, a manually operable member, and a yielding connection between the power motor housing and the manually operable member.

12. In a dirigible craft having a main control surface and an auxiliary trim tab surface, a power motor comprising a housing and a movable element operatively connected to the trim tab surface, an automatic pilot including a servomotor, means for operating said power motor operatively connected to said automatic pilot servomotor, and means for interlocking said power motor housing and the main control surface.

References Cited in the file of this patent

UNITED STATES PATENTS

| | | |
|---|---|---|
| 2,183,932 | Carlson | Dec. 19, 1939 |
| 2,272,725 | Overbeke | Feb. 10, 1942 |
| 2,640,665 | Gibb | June 2, 1953 |
| 2,678,177 | Chenery et al. | May 11, 1954 |